April 3, 1956     F. J. ZOSCHG     2,740,876
HOLLOW ARTICLE WELDING APPARATUS
Filed May 11, 1955
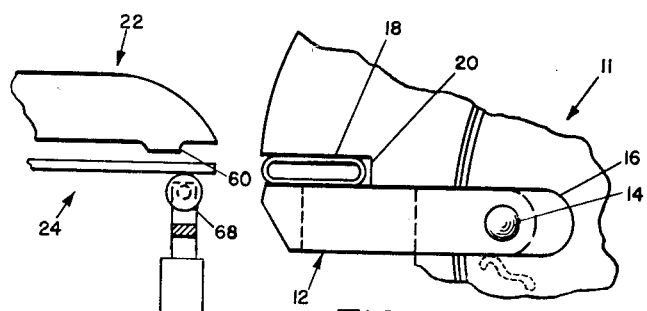
FIG. 1
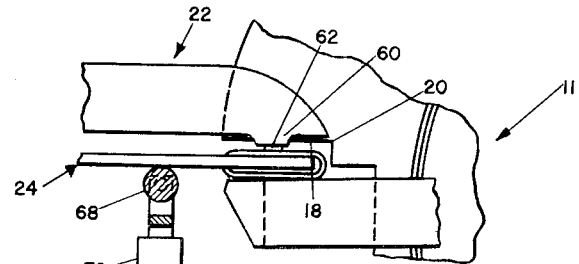
FIG. 2
FIG. 4
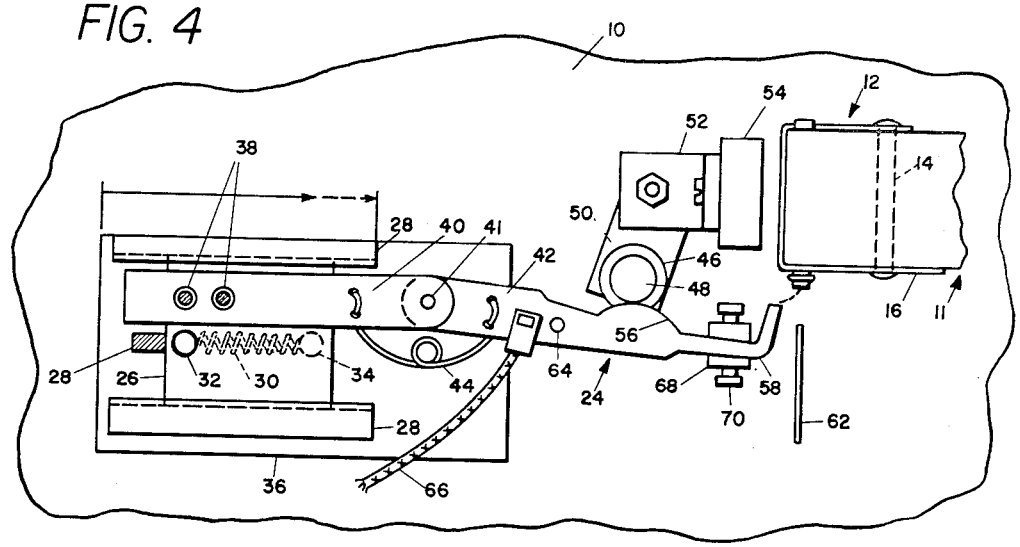
FIG. 3
INVENTOR
FRANK J. ZOSCHG
BY    *Michael Hertz*
ATTORNEY

United States Patent Office 2,740,876
Patented Apr. 3, 1956

2,740,876

HOLLOW ARTICLE WELDING APPARATUS

Frank J. Zoschg, Sinnemahoning, Pa., assignor to Sylvania Electric Products Inc., a corporation of Massachusetts Application May 11, 1955, Serial No. 507,683

8 Claims. (Cl. 219—4)

This invention relates to electric welding apparatus and in particular to electric welding of short ribbons of metallic material, called tabs, to the ends and exteriorly of metallic cathode sleeves. A sleeve forms the base structure for cathodes of electron tubes.

In the prior art, as exemplified by the patent to Pityo et al. 2,449,505, the tabs are welded onto the sleeves by the use of a pair of welding electrodes, one of which engages over the tab material when said material is placed in juxtaposition to the end of a sleeve held in a holder, and the other of which engages beneath the sleeve. When pressure is applied to bring the two electrodes toward each other, there is danger of distorting or even crushing the intervening sleeve, notwithstanding yielding supports for the sleeves. This is particularly true where the sleeve is made of thin or soft material. Furthermore since with the prior art structure, the electrode pressure had to be light, the welds, in many cases, were not satisfactory.

It is an object of this invention to provide in a machine of the Pityo et al. type means to weld a part such as a tab to a hollow article, such as a cathode sleeve, by applying pressure directly to the tab and to that wall of the sleeve to which the tab is to be affixed, thereby making it possible to obtain a firm weld with any desired amount of pressure and without danger of damaging the sleeve.

This and other objects will be apparent after reading the following specification and claims in conjunction with the accompanying drawing in which:

Fig. 1 is a fragmentary side elevation of a turret such as is utilized in the Pityo et al. machine, with welding jaws shown in a retracted position.

Fig. 2 is a similar view but with the welding electrodes in operative position, the lower electrode being within the cathode sleeve and underlying the top wall of the sleeve.

Fig. 3 is a plan view of the lower electrode with its movement controlling means and an adjacent turret portion holding a sleeve, the top welding electrode having been removed.

Fig. 4 is a detail view, partly in section, of a lower electrode support guide element.

Referring to the drawings in greater detail, at 10 there is shown a base on which is mounted a turret 11 corresponding to turret 91 in the Pityo et al. patent. This turret has a number of U-shaped cathode sleeve clamping stirrups 12 astride the periphery of the turret, each stirrup being pivoted as at 14 to the turret and provided with one arm 16 extending beyond the turret for engagement with fixed means in the path of movement of the stirrup to release a cathode sleeve held by the stirrup against a turret flat surface such as wall 18 of recess 20.

Cooperating with the turret is a pair of welding electrodes 22 and 24. These welding electrodes are mounted, insulated from one another, on a slide 26 slidable between ways 28, the slide being thrust toward the turret by the lower end 28 of a lever whose upper end is provided with a cam follower, as in the patent previously referred to. The slide is retracted by a spring 30 underneath the slide, the spring being fastened at one end to a pin 32 projecting downwardly from the slide and to a pin 34 projecting upwardly from a block 36 fixed on the machine base. The two electrodes are mounted on the slide by suitable insulated screw means. In Fig. 3, the upper electrode has been removed to better illustrate the invention and the screw means 38 are shown in section. Whereas in the prior art both electrodes are spring leaves, each made of an integral piece, in this invention the lower electrode is made of hinged sections 40 and 42, with a spring 44 at the pivot 41 tending to move the free end of the electrode section 42 toward a roller 46 mounted on a pin 48 extending up from a bracket 50, rotationally adjustably secured to another right angle bracket 52 secured to a standard 54 mounted on the base 10. On the section 42 of the electrode facing the roller 46 is a cam face 56, and the free end of the section is right angularly directed as seen at 58. The cam face 56 is so contoured, and the height of the electrode 24 is such that as the lever 28 advances the slide 26, the free end of the lower electrode will enter into the interior of the cathode sleeve and come to rest with the free end of the electrode 24 in registration with the welding projection 60 of the upper electrode. The trajectory followed by the free end of the electrode 24 is illustrated in Fig. 3. When the electrodes are in proper juxtaposed position a cathode tab such as tab 62 may be positioned on the outer face of the end of the cathode sleeve and a cam may be brought to bear on the upper electrode 22 to depress the upper electrode, tab and sleeve onto the lower electrode, as in the referred to patent. The lower electrode section 42 is provided with an insulating stud 64 to maintain the electrodes separated near the free ends of the electrodes and to prevent the cam from shorting the electrodes. Also the electric conductor 66 to the lower electrode is suitably connected to the section 42 of the electrode rather than to section 40, to avoid current flow through the pivot 41.

In order to guide and support the lower electrode section 42, there is provided a roller 68 pivotally mounted on a forked element 70 whose stem 72 is out of round and fits in a complemental opening 74 in a casing 76 fastened to the base 10. A light spring urges the roller 68 into contact with the under face of the lower electrode element 42, without affording much resistance to depression of the electrode on operation of the cam to depress the electrodes and entrained sleeve and tab.

Because the weld is effected with the electrodes directly engaging only the wall to which a tab is to be welded and to the tab, there is no danger of distorting the sleeve due to opposing pressures and the weld is much better since any reasonable amount of pressure may be applied between the electrodes.

Although the invention is here illustrated as associated with welding tabs on cathode sleeves, it should be realized that the device of the invention is equally capable of welding parts together where other hollow articles are employed.

Having thus described the invention what is claimed is:

1. In an electric welding apparatus, means for supporting a hollow elongated article, a pair of electrodes, means for moving said electrodes substantially perpendicularly of the axis of the elongated article to a position such that one electrode overlies the article, and additional means for moving the other of said electrodes so that it moves across an end edge of said article and then into the hollow of said article to a position in registration with said one electrode.

2. In an electric welding apparatus, means for supporting a hollow elongated article to which another article is to be welded, a pair of electrodes, means for moving said electrodes substantially perpendicularly of the axis of the elongated article to a position such that one electrode overlies the article, and additional means for moving the other of said electrodes so that it moves across an end edge of said article and then into the hollow of said article to a position in registration with said one electrode, said other article lying between one of the electrodes and the hollow elongated article.

3. In an electric welding apparatus an elongated pair of electrodes in side by side relation, means for axially moving both of said electrodes and means for guiding one of said electrodes so that its welding end shall travel, at the end of its motion, in a direction substantially at right angles to its axial motion and to a position opposite the end of the other electrode.

4. In electric welding apparatus, a pair of elongated electrodes in overlying relationship, means for moving the electrodes axially of the electrodes, one of the electrodes having a pivoted section, and means for controlling the motion of the free end of the pivoted section so that it has a component of motion at right angles to its axial motion and so that the free end is opposite the free end of the other of the electrodes.

5. In an electric welding apparatus, a pair of elongated, substantially parallel, welding electrodes movable axially of the electrodes, one of the electrodes having a pivoted section, stationarily mounted cam means, and cam means on the pivoted section of the said one electrode to move the free end of the station with a component in a direction at right angles to its axial displacement.

6. In an electric welding apparatus, a pair of elongated, substantially parallel, welding electrodes movable axially of the electroeds, one of the electrodes having a pivoted section, a stationarily mounted roller, a cam face on the pivoted section, spring means urging the cam face against the roller, the cam face being shaped to give the free end of the pivoted section a component of motion at right angles to the axial movement.

7. In an electric welding apparatus, a pair of elongated, substantially parallel, welding electrodes movable axially of the electrodes, one of the electrodes having a pivoted section, a stationarily mounted roller, a cam face on the pivoted section, spring means urging the cam face against the roller, the cam face being shaped to give the free end of the pivoted section a component of motion at right angles to the axial movement, and a second roller beneath the pivoted section to support the section during its longitudinal and pivotal motion.

8. In an electric welding apparatus, a pair of elongated, substantially parallel, welding electrodes movable axially of the electrodes, one of the electrodes having a pivoted section, a stationarily mounted roller, a cam face on the pivoted section, spring means urging the cam face against the roller, the cam face being shaped to give the free end of the pivoted section a component of motion at right angles to the axial movement, and a second yieldingly mounted roller beneath the pivoted section to support the section during its motion.

References Cited in the file of this patent

UNITED STATES PATENTS

| | | |
|---|---|---|
| 2,079,042 | Saives | May 4, 1937 |
| 2,449,505 | Pityo et al. | Sept. 14, 1948 |